(12) United States Patent
Solomatnikov et al.

(10) Patent No.: US 11,347,507 B2
(45) Date of Patent: May 31, 2022

(54) SECURE CONTROL FLOW PREDICTION

(71) Applicant: SiFive, Inc., San Mateo, CA (US)

(72) Inventors: Alex Solomatnikov, San Carlos, CA (US); Krste Asanovic, Berkeley, CA (US)

(73) Assignee: SiFive, Inc., San Mateo, CA (US)

( * ) Notice: Subject to any disclaimer, the term of this patent is extended or adjusted under 35 U.S.C. 154(b) by 355 days.

(21) Appl. No.: 16/241,455

(22) Filed: Jan. 7, 2019

(65) Prior Publication Data

US 2019/0286443 A1  Sep. 19, 2019

Related U.S. Application Data

(60) Provisional application No. 62/643,464, filed on Mar. 15, 2018.

(51) Int. Cl.
| | |
|---|---|
| *G06F 9/30* | (2018.01) |
| *G06F 12/0815* | (2016.01) |
| *G06F 12/1027* | (2016.01) |
| *G06F 12/02* | (2006.01) |
| *G06F 9/50* | (2006.01) |
| *G06F 9/355* | (2018.01) |

(52) U.S. Cl.
CPC ........ *G06F 9/3005* (2013.01); *G06F 9/30123* (2013.01); *G06F 9/3552* (2013.01); *G06F 9/5038* (2013.01); *G06F 12/0292* (2013.01); *G06F 12/0815* (2013.01); *G06F 12/1027* (2013.01)

(58) Field of Classification Search
None
See application file for complete search history.

(56) References Cited

U.S. PATENT DOCUMENTS

| | | |
|---|---|---|
| 5,276,882 A | 1/1994 | Emma et al. |
| 5,781,752 A | 7/1998 | Moshovos et al. |
| 7,814,299 B2 | 10/2010 | Hickey et al. |

(Continued)

OTHER PUBLICATIONS

C. Carruth; "RFC: Speculative Load Hardening (a Spectre variant #1 mitigation)"; Mar. 23, 2018, 21 pages; https://lists.llvm.org/pipermail/llvm-dev/2018-March/122085.html.

(Continued)

*Primary Examiner* — John M Lindlof
(74) *Attorney, Agent, or Firm* — Young Basile Hanlon & MacFarlane, P.C.

(57) ABSTRACT

Systems and methods are disclosed for secure control flow prediction. Some implementations may be used to eliminate or mitigate the Spectre-class of attacks in a processor. For example, an integrated circuit (e.g., a processor) for executing instructions includes a control flow predictor with entries that include respective indications of whether the entry has been activated for use in a current process, wherein the integrated circuit is configured to access the indication in one of the entries that is associated with a control flow instruction that is scheduled for execution; determine, based on the indication, whether the entry of the control flow predictor associated with the control flow instruction is activated for use in a current process; and responsive to a determination that the entry is not activated for use in the current process, apply a constraint on speculative execution based on control flow prediction for the control flow instruction.

58 Claims, 8 Drawing Sheets

(56) References Cited

U.S. PATENT DOCUMENTS

| | | | |
|---|---|---|---|
| 7,849,310 | B2 | 12/2010 | Watt et al. |
| 8,117,403 | B2 | 2/2012 | Heller, Jr. et al. |
| 8,873,329 | B1* | 10/2014 | Zheng ............... G11C 8/10 |
| | | | 365/230.01 |
| 9,063,721 | B2 | 6/2015 | Ghose |
| 10,565,378 | B1* | 2/2020 | Vincent ............ G06F 21/54 |
| 2006/0248319 | A1 | 11/2006 | Kadambi |
| 2009/0063221 | A1 | 3/2009 | Jonath et al. |
| 2011/0320793 | A1 | 12/2011 | Bell, Jr. et al. |
| 2013/0145135 | A1* | 6/2013 | Bell, Jr. ........... G06F 11/3409 |
| | | | 712/239 |
| 2015/0006855 | A1* | 1/2015 | Gschwind .......... G06F 9/3806 |
| | | | 712/207 |
| 2017/0123796 | A1* | 5/2017 | Kumar .............. G06F 12/0875 |
| 2019/0166158 | A1* | 5/2019 | Grocutt ............. H04L 63/1416 |
| 2019/0227804 | A1* | 7/2019 | Mukherjee ........ G06F 9/3806 |

OTHER PUBLICATIONS

C. Williams; "Three more data-leaking security holes found in Intel chips as designers swap security for speed" Aug. 14, 2018, pp. 1-12; https://www.theregister.co.uk/2018/08/14/intel_l1_terminal_fault_bugs.

V. Kiriansky, et al.; "Speculative Buffer Overflows: Attacks and Defenses"; Jul. 10, 2018; pp. 1-12.

J. Renau; "Securing Processors from Time Side Channels"; UC Santa Cruz; Apr. 4, 2018; 20 pages; https://escholarship.org/uc/item/6j02r9pw.

K. Khasawneh, et al.; "SafeSpec: Banishing the Spectre of a Meltdown with Leakage-Free Speculation"; Jun. 16, 2018, 12 pages.

K. Asanovic; CS 152 Computer Architecture and Engineering; CS252 Graduate Computer Architecture; Lecture 13—Advanced Out-of-Order Superscalars and Introduction to VLIW; Electrical Engineering and Computer Sciences, University of California at Berkeley; 2018; 39 pages.

M. Yan, et al.; "InvisiSpec: Making Speculative Execution Invisible in the Cache Hierarchy"; 2018; 14 pages.

M. Schwarz, et al.; "NetSpectre: Read Arbitrary Memory over Network"; Jul. 2018; 14 pages.

V. Kririansky, et al.; "DAWG: A Defense Against Cache Timing Attacks in Speculative Execution Processors"; 2018; 14 pages.

X. Dong, et al.; "Spectres, Virtual Ghosts, and Hardware Support"; HASP; Jun. 2, 2018; Los Angeles, CA; 9 pages.

G. Chen, et al.; "SGXPECTRE Attacks: Stealing Intel Secrets from SGX Enclaves via Speculative Execution"; Jun. 3, 2018; 16 pages.

C. Canella, et al.; "A Systematic Evaluation of Transient Execution Attacks and Defenses"; Nov. 13, 2018; 16 pages.

C. Celio, et al.; "Securing High-performance RISC-V Processors from Time Speculation"; Esperanto Technologies; 8th RISC-V Workshop, Barcelona, Spain; May 7, 2018; 29 pages.

International Search Report and Written Opinion for International application No. PCT/US2019/021998 dated May 30, 2019.

* cited by examiner

SECURE CONTROL FLOW PREDICTION

CROSS-REFERENCE TO RELATED APPLICATION(S)

This application claims the benefit of U.S. Provisional Application No. 62/643,464, filed on Mar. 15, 2018, which is incorporated herein by reference in its entirety.

TECHNICAL FIELD

This disclosure relates to secure control flow prediction.

BACKGROUND

Side-channel attacks have been disclosed that rely on processor branch prediction and speculative execution. For Intel x86 processors, the first of these attacks were initially labeled Spectre, other variants or classes of these attacks exist. Briefly, these attacks rely on training branch predictor to execute code chosen by the attacker to load the data into the cache memory after processes/context and/or privilege level change. Target code used by the attacker may be code from target process or from shared library, so it is legal for target process to execute the code. After the attacker process gets control of the processor again, the attacker can measure the time it takes to read the data, thereby determining if the data is present in the cache, and determining what is the data in the target process. Mitigating these attacks is important for secure and reliable computing.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Overview

Figure 1:
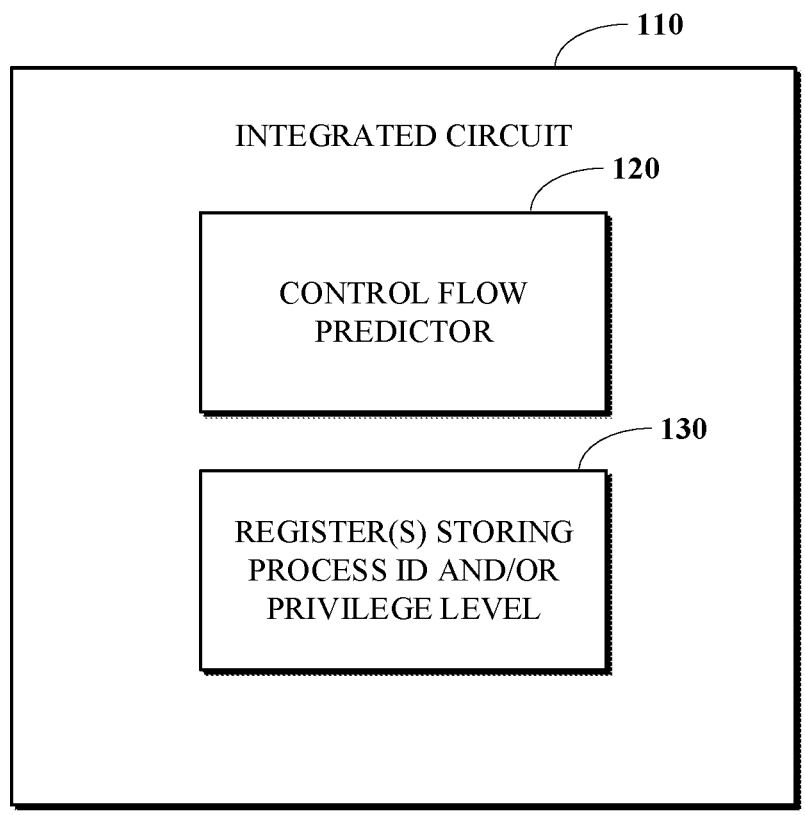
FIG. 1 is block diagram of an example of an integrated circuit for executing instructions with secure control flow prediction.

Disclosed herein are implementations of secure control flow prediction. Some implementations may be used to eliminate or mitigate the possibility of Spectre-class attacks on a processor, e.g. CPUs such as x86, ARM, and/or RISC-V CPUs, more efficiently than previously known solutions.

In a first aspect, the subject matter described in this specification can be embodied in integrated circuit for executing instructions that includes one or more registers configured to store a currently executing process identifier and a currently executing privilege level, an instruction decode buffer configured to store instructions fetched from memory while they are decoded for execution, and a control flow predictor with entries that include respective process identifiers and privilege levels. The integrated circuit is configured to access a first process identifier and a first privilege level in one of the entries that is associated with a control flow instruction stored in the decode buffer; compare the first process identifier and a first privilege level to, respectively, the currently executing process identifier and the currently executing privilege level; and responsive to a mismatch between the first process identifier and the currently executing process identifier or a mismatch between the first privilege level and the currently executing privilege level, apply a constraint on speculative execution based on control flow prediction for the control flow instruction. In some implementations, the constraint disables use of the one of the entries that is associated with the control flow instruction, preventing control flow prediction for the control flow instruction. In some implementations, the constraint disables use of the one of the entries that is associated with the control flow instruction, and causes speculative execution to proceed based on a prediction for the control flow instruction that is independent of data stored in the control flow predictor. For example, instead of determining the prediction based on data of the control flow predictor, the prediction used may be a static prediction (e.g., always predict taken or always predict not-taken), a prediction based on bits of the control flow instruction (e.g., backwards→taken and forward→not-taken), or a prediction based on a random value. In some implementations, the constraint prevents changes in a microarchitectural state of the integrated circuit caused by speculative execution based on a control flow prediction for the control flow instruction prior to validation of the control flow prediction. In some implementations, the constraint prevents update of a cache caused by speculative execution based on a control flow prediction for the control flow instruction prior to validation of the control flow prediction. In some implementations, the constraint prevents cache lines from being evicted and refilled in a cache and prevents generation of transactions on an interconnection of integrated circuit in response to cache misses caused by speculative execution based on a control flow prediction for the control flow instruction prior to validation of the control flow prediction. In some implementations, the constraint prevents cache lines prefetches caused by speculative execution based on a control flow prediction for the control flow instruction prior to validation of the control flow prediction. In some implementations, the constraint prevents update of a translation look-aside buffer caused by speculative execution based on a control flow prediction for the control flow instruction prior to validation of the control flow prediction. In some implementations, the constraint prevents speculative control flow prediction caused by speculative execution based on a control flow prediction for the control flow instruction prior to validation of the control flow prediction.

In a second aspect, the subject matter described in this specification can be embodied in methods that include accessing an indication in an entry in a control flow predictor that is associated with a control flow instruction that is scheduled for execution; determining, based on the indication, whether the entry of the control flow predictor associated with the control flow instruction is activated for use in a current process; responsive to a determination that the entry is not activated for use in the current process, applying a constraint on speculative execution based on control flow prediction for the control flow instruction; and executing the control flow instruction and one or more subsequent instructions subject to the constraint.

In a third aspect, the subject matter described in this specification can be embodied in integrated circuits for executing instructions that includes a control flow predictor with entries that include respective indications of whether the entry has been activated for use in a current process. The integrated circuit is configured to access the indication in one of the entries that is associated with a control flow instruction that is scheduled for execution; determine, based on the indication, whether the entry of the control flow predictor associated with the control flow instruction is activated for use in a current process; and responsive to a determination that the entry is not activated for use in the current process, apply a constraint on speculative execution based on control flow prediction for the control flow instruction.

These and other aspects of the present disclosure are disclosed in the following detailed description, the appended claims, and the accompanying figures.

Systems and methods for secure control flow prediction are disclosed. An integrated circuit (e.g., a processor or microcontroller) may be configured to decode and execute instructions of an instruction set architecture (ISA) (e.g., a RISC V instruction set). The integrated circuit may implement a pipelined architecture. The integrated circuit may include a control flow predictor (e.g., a branch predictor) for improving performance by reducing delays in executing instructions in the pipelined architecture. The control flow predictor includes control flow data arranged in entries that may be used to determine predictions for corresponding control flow instructions.

The entries of the control flow predictor may also include respective indications of whether or not the entry is activated (e.g. authorized) for use in a currently executing process. When an entry is activated for use in a current process, execution using speculative execution based on a prediction based on the entry may proceed normally. When an entry is not activated for use in a current process, a constraint on speculative execution may be applied to execution following the corresponding control flow instruction (e.g. a branch instruction). For example, the constraint on speculative execution may prevent certain updates of a state of the integrated circuit resulting from speculative execution or it may disable speculative execution using the entry altogether. For example, an entry of the control flow predictor may be activated after the first time the corresponding control flow instruction is executed by the current process or after the first time a prediction based on the entry is validated by the current process.

This constraint on speculative execution may serve to prevent or mitigate side-channel attacks that seek to transfer information between processes using microarchitectural state changes. In this manner, access to information may be better confined to each process of multiple processes running on the integrated circuit. For example, the multiple processes could include different processes within a single operating system. For example, the multiple processes could include processes in different operating systems on the integrated circuit. For example, the multiple processes could include processes related to internet sockets running on the integrated circuit. This structure for an integrated circuit and associated techniques described herein may improve security of the integrated circuit and software running on the integrated circuit.

As used herein, the term "circuit" refers to an arrangement of electronic components (e.g., transistors, resistors, capacitors, and/or inductors) that is structured to implement one or more functions. For example, a circuit may include one or more transistors interconnected to form logic gates that collectively implement a logical function.

As used herein, the term "microarchitectural state" refers to a portion of the state (e.g., bits of data) of an integrated circuit (e.g., a processor or microcontroller) that is not directly accessible by software executed by the integrated circuit. For example, a microarchitectural state may include data stored in a cache and/or data stored by control flow predictor that is used to make predictions about control flow execution.

Details

FIG. 1 is block diagram of an example of an integrated circuit 110 for executing instructions with secure control flow prediction. For example, the integrated circuit 110 may be a processor, a microprocessor, a microcontroller, or an IP core. The integrated circuit 110 includes a control flow predictor 120 and one or more registers 130 storing a currently executing process identifier and/or a currently executing privilege level. For example, the control flow predictor 120 may include a branch predictor, a branch history table, a branch target buffer, and/or a return address stack predictor. For example, the currently executing process identifier and/or the currently executing privilege level stored in the one or more registers 130 may be updated every time the processor does a context switch to a different process, or switches from user process to the operating system (kernel mode), or from operating system to virtual machine hypervisor (hypervisor mode). In some implementations, each entry of the control flow predictor 120 contains a process identifier and/or a privilege level that may be compared to the currently executing process identifier and/or the currently executing privilege level to determine whether the entry is activated or authorized for normal use in the currently executing process. For example, the control flow predictor 120 may be implemented as the control flow predictor 410 of FIG. 4. For example, the integrated circuit 110 may be used to implement to technique 500 of FIG. 5.

In some implementations, the control flow predictor 120 includes a branch history table (BHT) with entries that respectively have a process identifier and/or a privilege level, which may be compared to the currently executing process identifier and/or the currently executing privilege level to determine whether an entry of the branch history table has been activated for normal use in the current process. In some implementations, the control flow predictor 120 includes a branch target buffer (BTB) with entries that respectively have a process identifier and/or a privilege level, which may be compared to the currently executing process identifier and/or the currently executing privilege level to determine whether an entry of the branch target buffer has been activated for normal use in the current process. In some implementations, the control flow predictor 120 includes a return address stack (RAS) predictor with entries that respectively have a process identifier and/or a privilege level, which may be compared to the currently executing process identifier and/or the currently executing privilege level to determine whether an entry of the return address stack predictor has been activated for normal use in the current process.

In some implementations, when a process identifier or privilege level mismatch occurs, a process identifier and/or a privilege level of a corresponding entry of the control flow predictor 120 (e.g., a branch predictor entry, a BHT entry, a BTB entry, and/or a RAS predictor entry) are updated to the currently executing process identifier and/or the currently executing privilege level if and when a control flow prediction (e.g., a branch prediction) based on the corresponding entry is validated with the current process.

For example, when a process identifier or privilege level mismatch occurs, a constraint may be applied to speculative execution based on a prediction for the control flow instruction (e.g., a branch) generated using the corresponding entry of the control flow predictor 120. In some implementations, when a process identifier or privilege level mismatch occurs, a corresponding entry of the control flow predictor 120 (e.g., a branch predictor entry, a BHT entry, a BTB entry, and/or a RAS predictor entry) is not used for control flow prediction for a pending instruction of the current process. In some implementations, when a process identifier or privilege level mismatch occurs, a corresponding entry of the control flow predictor 120 (e.g., a branch predictor entry, a BHT entry, a BTB entry, and/or a RAS predictor entry) is not used for control flow prediction for a pending instruction of the current process, and the corresponding entry is discarded (e.g., the value(s) stored in the entry may be deleted or reset to a default value or a pointer to the entry may be deleted or updated to a default value). For example, the corresponding entry may be discarded immediately. In some implementations, when a process identifier or privilege level mismatch occurs, a corresponding entry of the control flow predictor 120 (e.g., a branch predictor entry, a BHT entry, a BTB entry, and/or a RAS predictor entry) is used to predict instruction execution, however, before the prediction is validated, any action that alters a state (e.g., a microarchitectural state) of the integrated circuit 110 (e.g., a processor) is discarded. In some implementations, when a process identifier or privilege level mismatch occurs, a corresponding entry of the control flow predictor 120 (e.g., a branch predictor entry, a BHT entry, a BTB entry, and/or a RAS predictor entry) is used to predict instruction execution, however, before the prediction is validated, cache misses that would happen as a result of prediction are ignored, cache lines are not evicted and not refilled in the cache, and no transactions are generated on the bus(es) or interconnection(s) to the rest of the system. In some implementations, when a process identifier or privilege level mismatch occurs, a corresponding entry of the control flow predictor 120 (e.g., a branch predictor entry, a BHT entry, a BTB entry, and/or a RAS predictor entry) is used to predict instruction execution, however, before the prediction is validated, cache line prefetches that would happen as a result of prediction are ignored, cache lines are not evicted and not refilled in the cache, and no transactions are generated on the bus(es) or interconnection(s) to the rest of the system. In some implementations, when a process identifier or privilege level mismatch occurs, a corresponding entry of the control flow predictor 120 (e.g., a branch predictor entry, a BHT entry, a BTB entry, and/or a RAS predictor entry) is used to predict instruction execution, however, before the prediction is validated, translation look-aside buffer (TLB) is not updated, TLB entries are not evicted or refilled and page table is not walked, and no transactions are generated on the bus(es) or interconnection(s) to the rest of the system. In some implementations, when a process identifier or privilege level mismatch occurs, a corresponding entry of the control flow predictor 120 (e.g., a branch predictor entry, a BHT entry, a BTB entry, and/or a RAS predictor entry) is used to predict instruction execution, however, before the prediction is validated, second (speculative) branch prediction and/or BHT and/or BTB prediction is not allowed.

In some implementations (not shown in FIG. 1), an integrated circuit includes a control flow predictor (e.g., a branch predictor) with entries that contain a flag (e.g., a single bit status register), which is set to one when the entry is activated. When a control flow predictor entry is used, its status register is checked. When integrated circuit does a context switch to a different process, or switches from user process to the operating system (kernel mode), or from operating system to virtual machine hypervisor (hypervisor mode), flags of all branch predictor entries are reset to 0. For example, the integrated circuit may be a processor, a microprocessor, a microcontroller, or an IP core. For example, the control flow predictor may include a branch predictor, a branch history table, a branch target buffer, and/or a return address stack predictor. In some implementations, each entry of the control flow predictor contains a flag (e.g., an entry status register), which may be checked to determine whether the entry is activated or authorized for normal use in the currently executing process. For example, the control flow predictor may be implemented as the control flow predictor 410 of FIG. 4. For example, the integrated circuit may be used to implement to technique 500 of FIG. 5.

In some implementations, the control flow predictor includes a branch history table (BHT) with entries that respectively have flags (e.g., an entry status register), which may be checked to determine whether an entry of the branch history table has been activated for normal use in the current process. A flag of an entry may be set to one when the branch predictor entry is activated. In some implementations, the control flow predictor includes a branch target buffer (BTB) with entries that respectively have flags (e.g., an entry status register), which may be checked to determine whether an entry of the branch target buffer has been activated for normal use in the current process. A flag of an entry may be set to one when the branch target buffer entry is activated. In some implementations, the control flow predictor includes a return address stack (RAS) predictor with entries that respectively have flags (e.g., an entry status register), which may be checked to determine whether an entry of the return address stack predictor has been activated for normal use in the current process. A flag of an entry may be set to one when the RAS predictor entry is activated.

In some implementations, when a flag of the entry (e.g., an entry status register) is not set, the flag of the corresponding entry of the control flow predictor (e.g., a branch predictor entry, a BHT entry, a BTB entry, and/or a RAS predictor entry) is set to 1 if and when a control flow prediction (e.g., a branch prediction) based on the corresponding entry is validated with the current process. In some implementations, all control flow predictor entries (e.g., BHT, BTB, and/or RAS) are invalidated (e.g., their flags are cleared) upon the occurrence of a context switch or privilege level change.

For example, when a flag of the entry (e.g., an entry status register) is not set, a constraint may be applied to speculative execution based on a prediction for the control flow instruction (e.g., a branch) generated using the corresponding entry of the control flow predictor. In some implementations, when a flag of the entry (e.g., an entry status register) is not set, a corresponding entry of the control flow predictor (e.g., a branch predictor entry, a BHT entry, a BTB entry, and/or a RAS predictor entry) is not used for control flow prediction for a pending instruction of the current process. In some implementations, when a flag of the entry (e.g., an entry status register) is not set, a corresponding entry of the control flow predictor (e.g., a branch predictor entry, a BHT entry, a BTB entry, and/or a RAS predictor entry) is not used for control flow prediction for a pending instruction of the current process, and the corresponding entry is discarded (e.g., the value(s) stored in the entry may be deleted or reset to a default value or a pointer to the entry may be deleted or updated to a default value). For example, the corresponding entry may be discarded immediately. In some implementations, when a flag of the entry (e.g., an entry status register) is not set, a corresponding entry of the control flow predictor (e.g., a branch predictor entry, a BHT entry, a BTB entry, and/or a RAS predictor entry) is used to predict instruction execution, however, before the prediction is validated, any action that alters a state (e.g., a microarchitectural state) of the integrated circuit (e.g., a processor) is discarded. In some implementations, when a flag of the entry (e.g., an entry status register) is not set, a corresponding entry of the control flow predictor (e.g., a branch predictor entry, a BHT entry, a BTB entry, and/or a RAS predictor entry) is used to predict instruction execution, however, before the prediction is validated, cache misses that would happen as a result of prediction are ignored, cache lines are not evicted and not refilled in the cache, and no transactions are generated on the bus(es) or interconnection(s) to the rest of the system. In some implementations, when a flag of the entry (e.g., an entry status register) is not set, a corresponding entry of the control flow predictor (e.g., a branch predictor entry, a BHT entry, a BTB entry, and/or a RAS predictor entry) is used to predict instruction execution, however, before the prediction is validated, cache line prefetches that would happen as a result of prediction are ignored, cache lines are not evicted and not refilled in the cache, and no transactions are generated on the bus(es) or interconnection(s) to the rest of the system. In some implementations, when a flag of the entry (e.g., an entry status register) is not set, a corresponding entry of the control flow predictor (e.g., a branch predictor entry, a BHT entry, a BTB entry, and/or a RAS predictor entry) is used to predict instruction execution, however, before the prediction is validated, translation look-aside buffer (TLB) is not updated, TLB entries are not evicted or refilled and page table is not walked, and no transactions are generated on the bus(es) or interconnection(s) to the rest of the system. In some implementations, when a flag of the entry (e.g., an entry status register) is not set, a corresponding entry of the control flow predictor (e.g., a branch predictor entry, a BHT entry, a BTB entry, and/or a RAS predictor entry) is used to predict instruction execution, however, before the prediction is validated, second (speculative) branch prediction and/or BHT and/or BTB prediction is not allowed.

Figure 2:
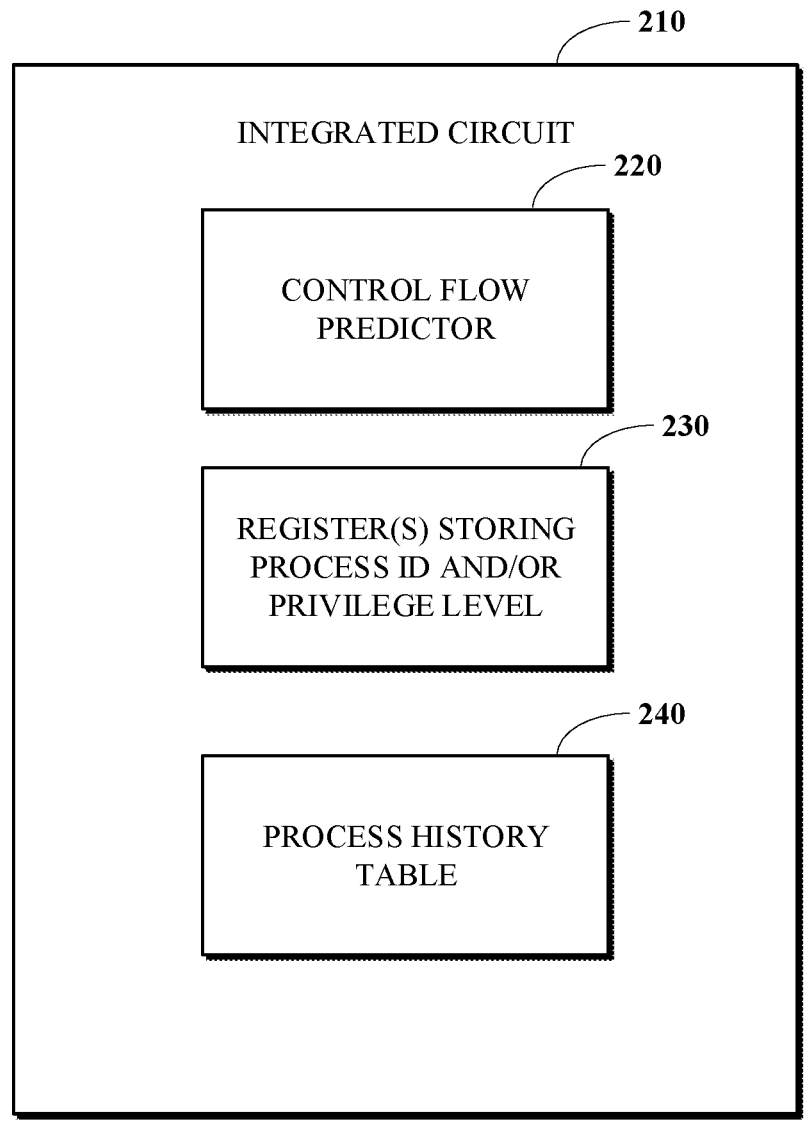
FIG. 2 is block diagram of an example of an integrated circuit for executing instructions with secure control flow prediction.

FIG. 2 is block diagram of an example of an integrated circuit 210 for executing instructions with secure control flow prediction. For example, the integrated circuit 210 may be a processor, a microprocessor, a microcontroller, or an IP core. The integrated circuit 210 includes a control flow predictor 220, one or more registers 230 storing a currently executing process identifier and/or a currently executing privilege level, and a process history table 240 with entries that include respective process identifiers and/or privilege levels. For example, the control flow predictor 220 may include a branch predictor, a branch history table, a branch target buffer, and/or a return address stack predictor. For example, the currently executing process identifier and/or the currently executing privilege level stored in the one or more registers 130 may be updated every time the processor does a context switch to a different process, or switches from user process to the operating system (kernel mode), or from operating system to virtual machine hypervisor (hypervisor mode). The process history table 240 may be configured to be indexed using a process history table index. In some implementations, each entry of the control flow predictor 220 may include a process history table (PHT) index, which may be used to access (e.g., read) an entry of the process history table 240 to compare a process identifier and/or a privilege level stored in the PHT entry to the currently executing process identifier and/or the currently executing privilege level to determine whether the entry is activated or authorized for normal use in the currently executing process. For example, the control flow predictor 220 may be implemented as the control flow predictor 410 of FIG. 4. For example, the integrated circuit 110 may be used to implement to technique 500 of FIG. 5.

For example, the process history table 240 may be implemented as a circular buffer with N entries including respective process identifiers and privilege levels for the last N processes to be executed. The process history table 240 may be updated when a current process is switched by writing a corresponding new process identifier and new privilege level in the entry at a next head of the circular buffer of the process history table. For example, when the integrated circuit 210 (e.g., a processor) does a context switch, a new process identifier and/or a new privilege level may be written in the head of the circular buffer of the process history table 240. In some implementations, entries of control flow predictor 220 may contain a respective PHT index, with N values corresponding to N entries in process history table 240 and an additional special value (of PHT index) that does not correspond to any entry in the process history table 240. In some implementations, if an entry of the control flow predictor 220 has a PHT index equal to the special value, the process history table 240 is not accessed and this case is always treated as process identifier or privilege level mismatch. In some implementations, in the event of process history table 240 wraparound and overwrite of a previously written process identifier and/or privilege level, all entries of the control flow predictor 220 (e.g., a branch predictor entry, a BHT entry, a BTB entry, and/or a RAS predictor entry) may have their respective process history table index reset to the special value to indicate that the entry is not activated for normal use with the current process. In some implementations, in the event of process history table 240 wraparound and overwrite of a previously written process identifier and/or privilege level, only entries of the control flow predictor 220 (e.g., a branch predictor entry, a BHT entry, a BTB entry, and/or a RAS predictor entry) that point to the overwritten entry of the process history table 240 have their respective process history table index reset to the special value to indicate that the entry is not activated for normal use with the current process.

In some implementations, the control flow predictor 220 includes a branch history table (BHT) with entries that respectively have a process history table index, which may be used to access (e.g., read) an entry of the process history table 240 to compare a process identifier and/or a privilege level stored in the PHT entry to the currently executing process identifier and/or the currently executing privilege level, to determine whether an entry of the branch history table has been activated for normal use in the current process. In some implementations, the control flow predictor 220 includes a branch target buffer (BTB) with entries that respectively have a process history table index, which may be used to access (e.g., read) an entry of the process history table 240 to compare a process identifier and/or a privilege level stored in the PHT entry to the currently executing process identifier and/or the currently executing privilege level, to determine whether an entry of the branch target buffer has been activated for normal use in the current process. In some implementations, the control flow predictor 220 includes a return address stack (RAS) predictor with entries that respectively have a process history table index, which may be used to access (e.g., read) an entry of the process history table 240 to compare a process identifier and/or a privilege level stored in the PHT entry to the currently executing process identifier and/or the currently executing privilege level, to determine whether an entry of the return address stack predictor has been activated for normal use in the current process.

In some implementations, when a process identifier or privilege level mismatch occurs or special value of the process history table index is accessed, a process history table index of a corresponding entry of the control flow predictor 220 (e.g., a branch predictor entry, a BHT entry, a BTB entry, and/or a RAS predictor entry) is updated to the current head of process history table 240 if and when a control flow prediction (e.g., a branch prediction) based on the corresponding entry is validated with the current process.

For example, when a process identifier or privilege level mismatch occurs or special value of the process history table index is accessed or special value of the process history table index is accessed, a constraint may be applied to speculative execution based on a prediction for the control flow instruction (e.g., a branch) generated using the corresponding entry of the control flow predictor 220. In some implementations, when a process identifier or privilege level mismatch occurs or special value of the process history table index is accessed, a corresponding entry of the control flow predictor 220 (e.g., a branch predictor entry, a BHT entry, a BTB entry, and/or a RAS predictor entry) is not used for control flow prediction for a pending instruction of the current process. In some implementations, when a process identifier or privilege level mismatch occurs or special value of the process history table index is accessed, a corresponding entry of the control flow predictor 220 (e.g., a branch predictor entry, a BHT entry, a BTB entry, and/or a RAS predictor entry) is not used for control flow prediction for a pending instruction of the current process, and the corresponding entry is discarded (e.g., the value(s) stored in the entry may be deleted or reset to a default value or a pointer to the entry may be deleted or updated to a default value). For example, the corresponding entry may be discarded immediately. In some implementations, when a process identifier or privilege level mismatch occurs or special value of the process history table index is accessed, a corresponding entry of the control flow predictor 220 (e.g., a branch predictor entry, a BHT entry, a BTB entry, and/or a RAS predictor entry) is used to predict instruction execution, however, before the prediction is validated, any action that alters a state (e.g., a microarchitectural state) of the integrated circuit 210 (e.g., a processor) is discarded. In some implementations, when a process identifier or privilege level mismatch occurs or special value of the process history table index is accessed, a corresponding entry of the control flow predictor 220 (e.g., a branch predictor entry, a BHT entry, a BTB entry, and/or a RAS predictor entry) is used to predict instruction execution, however, before the prediction is validated, cache misses that would happen as a result of prediction are ignored, cache lines are not evicted and not refilled in the cache, and no transactions are generated on the bus(es) or interconnection(s) to the rest of the system. In some implementations, when a process identifier or privilege level mismatch occurs or special value of the process history table index is accessed, a corresponding entry of the control flow predictor 220 (e.g., a branch predictor entry, a BHT entry, a BTB entry, and/or a RAS predictor entry) is used to predict instruction execution, however, before the prediction is validated, cache line prefetches that would happen as a result of prediction are ignored, cache lines are not evicted and not refilled in the cache, and no transactions are generated on the bus(es) or interconnection(s) to the rest of the system. In some implementations, when a process identifier or privilege level mismatch occurs or special value of the process history table index is accessed, a corresponding entry of the control flow predictor 220 (e.g., a branch predictor entry, a BHT entry, a BTB entry, and/or a RAS predictor entry) is used to predict instruction execution, however, before the prediction is validated, translation lookaside buffer (TLB) is not updated, TLB entries are not evicted or refilled and page table is not walked, and no transactions are generated on the bus(es) or interconnection(s) to the rest of the system. In some implementations, when a process identifier or privilege level mismatch occurs or special value of the process history table index is accessed, a corresponding entry of the control flow predictor 220 (e.g., a branch predictor entry, a BHT entry, a BTB entry, and/or a RAS predictor entry) is used to predict instruction execution, however, before the prediction is validated, second (speculative) branch prediction and/or BHT and/or BTB prediction is not allowed.

Figure 3:
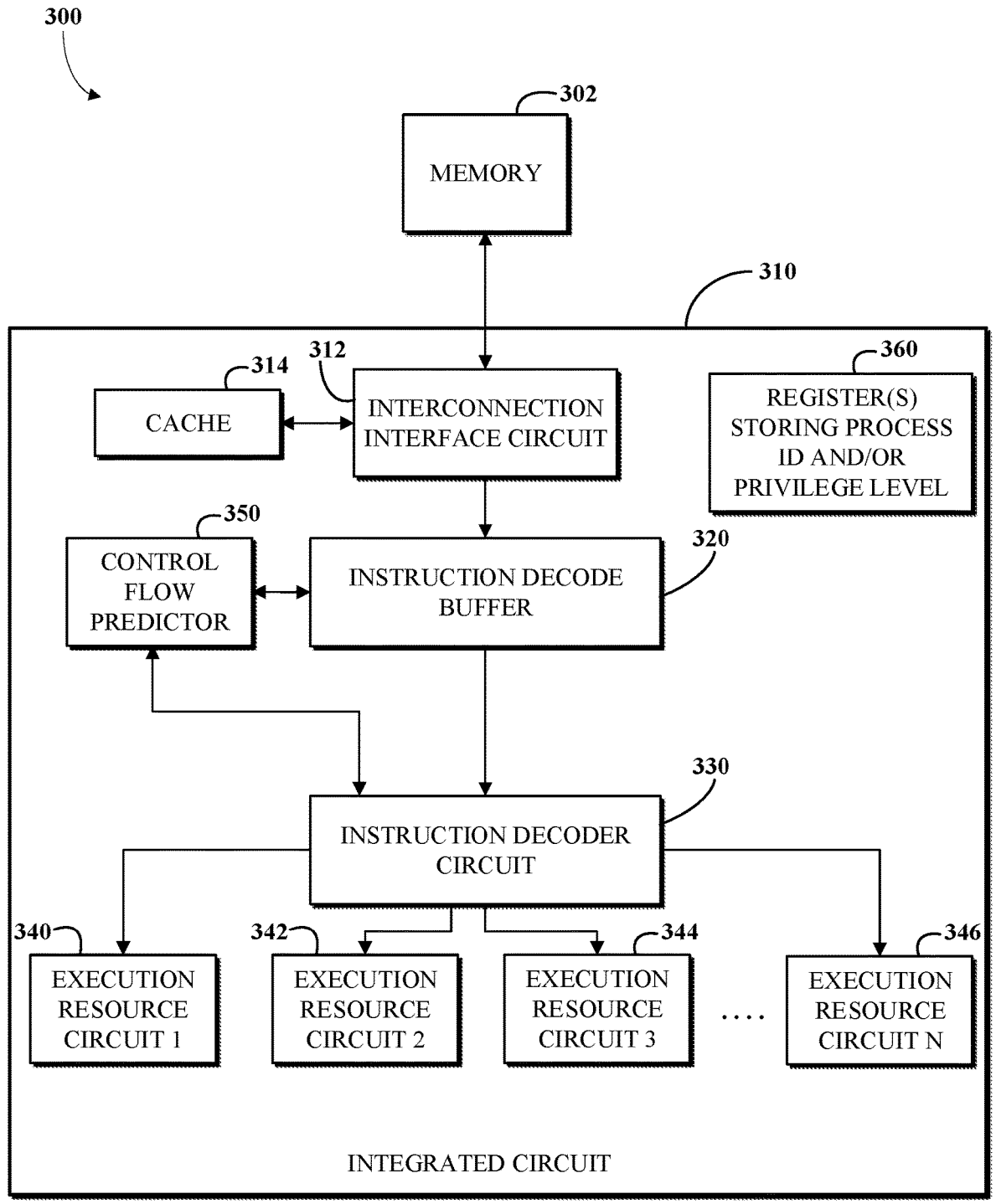
FIG. 3 is block diagram of an example of a system for executing instructions with secure control flow prediction.

FIG. 3 is block diagram of an example of a system 300 for executing instructions with secure control flow prediction. The system 300 includes a memory 302 storing instructions and an integrated circuit 310 configured to execute the instructions. For example, the integrated circuit 310 may be a processor, a microprocessor, a microcontroller, or an IP core. The integrated circuit 310 includes an interconnection interface circuit 312; a cache 314; an instruction decode buffer 320 configured to store instructions that have been fetched from the memory 302; an instruction decoder circuit 330 configured to decode instructions from the instruction decode buffer 320 and pass corresponding micro-ops to one or more execution resource circuits (340, 342, 344, and 346) for execution; a control flow predictor 350; and one or more registers 360 storing a currently executing process identifier and/or a currently executing privilege level. For example, the control flow predictor 350 may be implemented as the control flow predictor 410 of FIG. 4. For example, the integrated circuit 310 may be configured to implement the technique 500 of FIG. 5.

The interconnection interface circuit 312 (e.g., a bus interface circuit) is configured to transfer data to and from external devices including the memory 302. For example, the interconnection interface circuit 312 may be configured to fetch instructions from the memory 302 and store them in the instruction decode buffer 320 while the instructions are processed by a pipelined architecture of the integrated circuit 310. For example, the interconnection interface circuit 312 may be configured to write data resulting from the execution of instructions to the memory 302 during a write back phase of a pipeline. For example, the interconnection interface circuit 312 may fetch a block of data (e.g., instructions) using a direct memory access (DMA) channel. The interconnection interface circuit 312 may be configured to use the cache 314 to optimize data transfers.

The integrated circuit 310 includes an instruction decode buffer 320 configured to store instructions fetched from memory 302 while they are decoded for execution. For example, the instruction decode buffer 320 may have a depth (e.g., 4, 8, 12, 16, or 24 instructions) that facilitates a pipelined and/or superscalar architecture of the integrated circuit 310. The instructions may be members of an instruction set (e.g., a RISC V instruction set, an x86 instruction set, an ARM instruction set, or a MIPS instruction set) supported by the integrated circuit 310.

The integrated circuit 310 includes one or more execution resource circuits (340, 342, 344, and 346) configured to execute instructions or micro-ops to support an instruction set. For example, the instruction set may be a RISC V instruction set. For example, the one or more execution resource circuits (340, 342, 344, and 346) may include an adder, a shifter (e.g., a barrel shifter), a multiplier, and/or a floating point unit. The one or more execution resource circuits (340, 342, 344, and 346) may update the state of the integrated circuit 310, including internal registers and/or flags or status bits (not explicitly shown in FIG. 3) and micro architectural state based on results of executing instructions. Results of execution of an instruction may also be written to the memory 302 (e.g., during subsequent stages of a pipelined execution).

The integrated circuit 310 includes an instruction decoder circuit 330 configured to decode the instructions in the instruction decode buffer 320. The instruction decode buffer 320 may convert the instructions into corresponding micro-ops that are internally executed by the integrated circuit 310 using the one or more execution resource circuits (340, 342, 344, and 346). The instruction decoder circuit 330 is configured to use predictions from the control flow predictor 350 to schedule instructions for execution and implement speculative execution.

The integrated circuit 310 includes a control flow predictor 350 with entries that include respective indications of whether the entry has been activated for use in a current process. The entries of the control flow predictor 350 may also store data (e.g., a counter) used to determine predictions for a control flow instruction. The indications may be used to improve security for data processed by the integrated circuit 310 by reducing the opportunity for interactions between different processes via the control flow predictor 350 and/or other parts of a microarchitectural state of the integrated circuit 310. In some implementations, the indication for entry of control flow predictor 350 may include a process identifier. The process identifier for an entry may indicate that the entry is activated for normal use with the process corresponding to the process identifier. In some implementations, the indication for entry of control flow predictor 350 may include a privilege level. The process identifier for an entry may indicate that the entry is activated for normal use with the process with a privilege level matching (e.g., = or >=) the privilege level of the entry. For example, the control flow predictor 350 may include entries that include respective process identifiers and privilege levels. In some implementations, the indication for entry of control flow predictor 350 may include a process history table index, which points to an entry in a process history table (e.g., the process history table 240) (not shown in FIG. 3). The process history table index for an entry of the control flow predictor 350 may be used to access a process identifier and/or a privilege level from a process history table, which can be compared to the currently executing process identifier and a currently executing privilege level to determine whether the entry is activated for normal use with the current process. In some implementations, the indication for entry of control flow predictor 350 may include a flag that is set when the entry is activated for a current process and cleared when a process switch occurs. The flag for an entry of the control flow predictor 350 may be checked to determine whether the entry is activated for normal use with the current process.

For example, the control flow predictor 350 may include a branch predictor, a branch history table, a branch target buffer, and/or a return address stack predictor. In some implementations, the control flow predictor 350 includes a branch history table with entries that include respective process identifiers and privilege levels. In some implementations, the control flow predictor 350 includes a branch target buffer with entries that include respective process identifiers and privilege levels. In some implementations, the control flow predictor 350 includes a return address stack predictor with entries that include respective process identifiers and privilege levels.

An indication for an entry of the control flow predictor 350 may be used to determine whether the entry of the control flow predictor 350 associated with a control flow instruction is activated for use in a current process, so that speculative execution may be constrained when appropriate to prevent or mitigate side-channel attacks between processes. In some implementations, where the indication includes a process identifier and a privilege level, the integrated circuit 310 may be configured to access a first process identifier and a first privilege level in one of the entries that is associated with a control flow instruction stored in the decode buffer; compare the first process identifier and a first privilege level to, respectively, the currently executing process identifier and the currently executing privilege level; and, responsive to a mismatch between the first process identifier and the currently executing process identifier or a mismatch between the first privilege level and the currently executing privilege level, apply a constraint on speculative execution based on control flow prediction for the control flow instruction.

The constraints on speculative execution based on control flow prediction for a control flow instruction can take many forms. For example, the constraint may disable use of the one of the entries that is associated with the control flow instruction, preventing control flow prediction for the control flow instruction. In some implementations, the entry that is associated with the control flow instruction is discarded (e.g., deleted or reset to a default value). For example, the constraint may prevent changes in a microarchitectural state (e.g., the cache 314) of the integrated circuit caused by speculative execution based on a control flow prediction for the control flow instruction prior to validation of the control flow prediction. For example, the constraint may prevent cache lines from being evicted and refilled in a cache and prevent generation of transactions on an interconnection (e.g., via the interconnection interface circuit 312) of the integrated circuit 310 in response to cache misses caused by speculative execution based on a control flow prediction for the control flow instruction prior to validation of the control flow prediction. For example, the constraint may prevent update of a cache caused by speculative execution based on a control flow prediction for the control flow instruction prior to validation of the control flow prediction. For example, the constraint may prevent cache lines prefetches caused by speculative execution based on a control flow prediction for the control flow instruction prior to validation of the control flow prediction. For example, the constraint may prevent update of a translation look-aside buffer caused by speculative execution based on a control flow prediction for the control flow instruction prior to validation of the control flow prediction. For example, the constraint may prevent speculative control flow prediction caused by speculative execution based on a control flow prediction for the control flow instruction (e.g., nested speculative execution) prior to validation of the control flow prediction.

The indication for an entry of the control flow predictor 350 may be updated to activate the entry for use with a current process after a safety condition has occurred. In some implementations, the indication may be updated after the first use, regardless of the outcome of the prediction generated during the first use. In some implementations, the indication may be updated after fixed number of uses. In some implementations, the indication may be updated after a prediction made for the current process based on the entry has been validated. For example, responsive to validation of a prediction for the control flow instruction by the control flow predictor, the process identifier and the privilege level of the entry that is associated with a control flow instruction may be updated to, respectively, the currently executing process identifier and the currently executing privilege level.

The integrated circuit 310 includes one or more registers 360 configured to store a currently executing process identifier and a currently executing privilege level. For example, the integrated circuit 310 may be configured to update the currently executing process identifier and the currently executing privilege level stored in the one or more registers when the integrated circuit performs a context switch to a different process, or switches from a user process to an operating system, or switches from an operating system to a virtual machine hypervisor.

Figure 4:
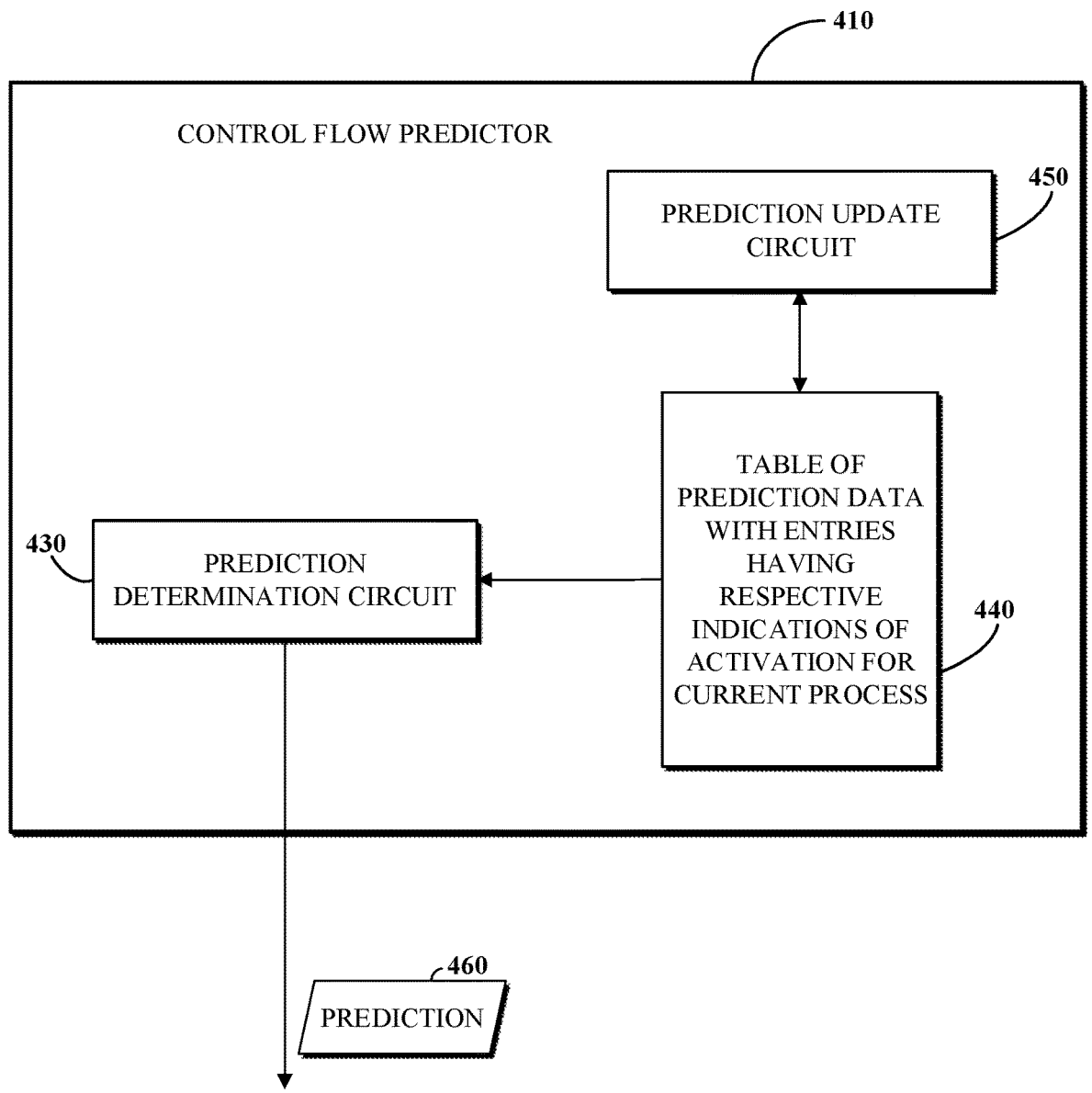
FIG. 4 is block diagram of an example of a control flow predictor for secure control flow prediction.

FIG. 4 is block diagram of an example of a control flow predictor 410 for secure control flow prediction. The control flow predictor 410 includes a prediction determination circuit 430; a table of prediction data 440 with entries that includes respective indications of activation for a current process; and a prediction update circuit 450. The prediction determination circuit is configured to determine a prediction 460 for a control flow instruction based on data in an entry of the table of prediction data 440 corresponding to the subject control flow instruction. However, when the indication (e.g., a flag, a process history table index, a process identifier, and/or a privilege level) of the entry indicates that the entry is not activated for a currently executing process, a constraint may be applied to speculative execution based on the data of the entry. For example, a constraint may alter the prediction 460 or prevent generation of the prediction 460. In some implementations, a constraint may have no effect on the prediction 460, while limiting execution based on the prediction. For example, the control flow predictor 410 may be used in implementing the technique 500 of FIG. 5.

For example, the control flow predictor 410 may include a branch predictor and the prediction 460 may include a prediction of whether a subject branch instruction will be taken. For example, an entry of the table of prediction data 440 may include a respective counter (e.g., a two bit saturating counter) reflecting the frequency at which a corresponding branch instruction has been taken in the recent past. In some implementations, the control flow predictor 410 includes a branch history table. For example, an entry of the table of prediction data 440 may include a respective shift register reflecting the branching history of a corresponding branch instruction in the recent past. For example, entries of the table of prediction data 440 may be indexed by program counter. The prediction determination circuit 430 is configured to determine a prediction 460 for a control flow instruction based on data in an entry of the table of prediction data 440 corresponding to the subject control flow instruction. For example, the prediction 460 for a branch instruction may be "taken" if a saturating counter in a corresponding entry of the table of prediction data 440 is above a threshold.

The entries of the table of prediction data 440 include respective indications of activation for a current process. For example, an entry of the table of prediction data 440 may include a flag (e.g., single bit) indicating whether or not a current process is activated for use with the entry. For example, an entry of the table of prediction data 440 may include a process identifier that identifies a process that is activated for use with the entry, which may be compared to the currently executing process identifier. For example, an entry of the table of prediction data 440 may include a privilege level associated with activation for use with the entry, which may be compared to the currently executing privilege level (i.e., the privilege level of a currently executing process). For example, an entry of the table of prediction data 440 may include a process history table index that points to a process identifier and/or a privilege level that identifies a process that is activated for use with the entry, which may be compared to the currently executing process identifier.

The prediction update circuit 450 is configured to update the table of prediction data 440 after execution of a control flow instruction. For example, when a branch instruction is taken, the prediction update circuit 450 may increment a saturating counter in an entry of the table of prediction data 440 corresponding to the branch instruction. For example, when a branch instruction is not taken, the prediction update circuit 450 may decrement a saturating counter in an entry of the table of prediction data 440 corresponding to the branch instruction. The prediction update circuit 450 may also be configured to update an indication of the corresponding entry. For example, an indication (e.g., a flag, a process history table index, a process identifier, and/or a privilege level) of the entry may be updated to indicate that the entry is activated for use in the current process after execution of the corresponding instruction. In some implementations, an indication (e.g., a flag, a process history table index, a process identifier, and/or a privilege level) of the entry may be updated to indicate that the entry is activated for use in the current process responsive to validation of the prediction 460 made for the corresponding control flow instruction. In some implementations, the prediction update circuit 450 is configured to update all the indications in the table of prediction data 440 when the currently executing process changes. For example, prediction update circuit 450 may be configured to clear flag indications in the entries of the table of prediction data 440 when a context switch occurs.

Figure 5:
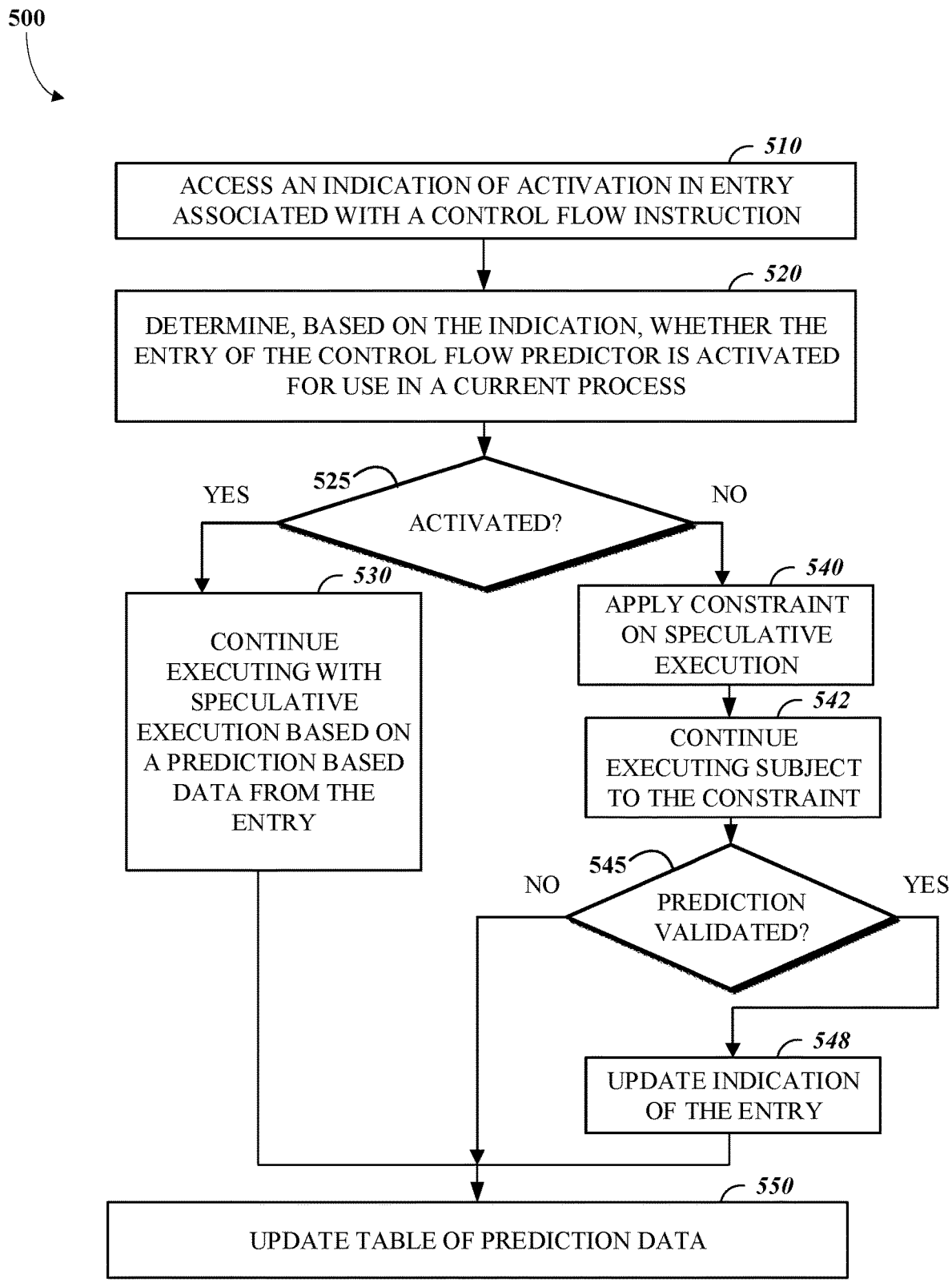
FIG. 5 is flow chart of an example of a technique for executing instructions with secure control flow prediction.

FIG. 5 is flow chart of an example of a technique 500 for executing instructions with secure control flow prediction. The technique 500 includes accessing 510 an indication in an entry in a control flow predictor that is associated with a control flow instruction that is scheduled for execution; and determining 520, based on the indication, whether the entry of the control flow predictor associated with the control flow instruction is activated for use in a current process. The technique 500 may include, responsive to a determination that the entry is activated for use in the current process, continuing to execute 530 with speculative execution based on a prediction based on data from the entry. The technique 500 may include, responsive to a determination that the entry is not activated for use in the current process, applying 540 a constraint on speculative execution based on control flow prediction for the control flow instruction; and executing 542 the control flow instruction and one or more subsequent instructions subject to the constraint. The technique 500 may include, responsive to a determination that the prediction for the flow control instruction has been validated, updating 548 the indication of the entry to activate the entry for use with the current process. The process includes updating a table of prediction data of the control flow predictor. For example, the technique 500 may be implemented using the integrated circuit 110 of FIG. 1. For example, the technique 500 may be implemented using the integrated circuit 210 of FIG. 2. For example, the technique 500 may be implemented using the system 300 of FIG. 3.

The technique 500 includes accessing 510 an indication in an entry in a control flow predictor (e.g., the control flow predictor 410) that is associated with a control flow instruction that is scheduled for execution. For example, the control flow instruction may be a branch instruction or subroutine call instruction. For example, the control flow instruction may be stored in a decode buffer (e.g., the instruction decode buffer 320). In some implementations, the control flow predictor includes a branch history table with entries that include respective indications of whether the entry has been activated for use in a current process. In some implementations, the control flow predictor includes a branch target buffer with entries that include respective indications of whether the entry has been activated for use in a current process. In some implementations, the control flow predictor includes a return address stack predictor with entries that include respective indications of whether the entry has been activated for use in a current process. For example, the indication may include a flag (e.g., a single bit), a process history table index, a process identifier, and/or a privilege level. In some implementations, the entry, including the indication, is selected or identified based on a program counter value associated with the control flow instruction. For example, accessing 510 the indication may include reading the value of the indication and/or passing the value of the indication to a comparator for comparison.

The technique 500 includes determining 520, based on the indication, whether the entry of the control flow predictor associated with the control flow instruction is activated for use in a current process. For example, the technique 600 of FIG. 6 may be implemented to determine 520, based on the indication, whether the entry is activated for use in a current process. For example, the technique 700 of FIG. 7 may be implemented to determine 520, based on the indication, whether the entry is activated for use in a current process. For example, the technique 800 of FIG. 8 may be implemented to determine 520, based on the indication, whether the entry is activated for use in a current process.

If (at operation 525) the entry is activated for use with the current process, then the technique 500 includes continuing to execute 530 instructions with speculative execution based on a prediction (e.g., branch taken or not taken) based on data from the entry (e.g., the value of a saturating counter and/or the value of a branch history shift register). Speculative execution may enable a processor to achieve higher performance by avoiding pipeline delays.

If (at operation 525) the entry is not activated for use with the current process, then the technique 500 includes, responsive to a determination that the entry is not activated for use in the current process, applying 540 a constraint on speculative execution based on control flow prediction for the control flow instruction. For example, the constraint may disable use of the entry that is associated with the control flow instruction, preventing control flow prediction for the control flow instruction. In some implementations, the entry that is associated with the control flow instruction is discarded (e.g., the entry is deleted or reset to a default value). In some implementations, the constraint disables use of the entry that is associated with the control flow instruction, and causes speculative execution to proceed based on a prediction for the control flow instruction that is independent of data stored in the control flow predictor. For example, instead of determining the prediction based on data of the control flow predictor, the prediction used may be a static prediction (e.g., always predict taken or always predict not-taken), a prediction based on bits of the control flow instruction (e.g., backwards→taken and forward→not-taken), or a prediction based on a random value. For example, the constraint may prevent changes in a microarchitectural state (e.g., a cache or data stored in a predictor) of an integrated circuit caused by speculative execution based on a control flow prediction for the control flow instruction prior to validation of the control flow prediction. For example, the constraint may prevent update of a cache caused by speculative execution based on a control flow prediction for the control flow instruction prior to validation of the control flow prediction. For example, the constraint may prevent cache lines from being evicted and refilled in a cache and may prevent generation of transactions on an interconnection of integrated circuit in response to cache misses caused by speculative execution based on a control flow prediction for the control flow instruction prior to validation of the control flow prediction. For example, the constraint may prevent cache line prefetches caused by speculative execution based on a control flow prediction for the control flow instruction prior to validation of the control flow prediction. For example, the constraint may prevent update of a translation look-aside buffer caused by speculative execution based on a control flow prediction for the control flow instruction prior to validation of the control flow prediction. For example, the constraint may prevent speculative control flow prediction (e.g., nested control flow prediction) caused by speculative execution based on a control flow prediction for the control flow instruction prior to validation of the control flow prediction.

The technique 500 includes executing 542 the control flow instruction and one or more subsequent instructions subject to the constraint. In some implementations, the constraint causes execution to continue without speculative execution, thus incurring delays corresponding to the length of an execution pipeline while the results of the control flow instruction are determined. In some implementations, the constraint allows execution to continue with speculative execution, unless and until a modification of microarchitectural state of the integrated circuit (e.g. a processor or microcontroller) is attempted. When a prohibited modification of state is called for by a speculative instruction, the speculative execution may be prevented and delays corresponding to the length of an execution pipeline may be incurred while the results of the control flow instruction are determined.

If (at operation 545) the prediction for the control flow instruction is validated, then the technique 500 includes, responsive to validation of a prediction for the control flow instruction by the control flow predictor, update 548 the indication of the entry that is associated with a control flow instruction to activate the entry for use in the current process. For example, updating 548 the indication of the entry may include setting a flag of the indication. In some implementations (where flag indications are used), an integrated circuit (e.g., a processor) may be configured to clear all of the indications in the control flow predictor when the integrated circuit performs a context switch to a different process, or switches from a user process to an operating system, or switches from an operating system to a virtual machine hypervisor. Thus, setting the flag of the indication activates the entry for unconstrained use in the current process, which may have been recently switched in. For example, updating 548 the indication of the entry may include writing a currently executing process identifier and/or a currently executing privilege level to the indication of the entry, which may be stored in one or more registers (e.g., the one or more registers 360).

Some implementations use a process history table (e.g., the process history table 240) to facilitate the maintenance of indications of activation for entries in the control flow predictor. For example, updating 548 the indication of the entry may include writing a process history table index to the indication of the entry, where the updated index points to a head of a process history table. For example, the process history table may be implemented as a circular buffer with N entries including respective process identifiers and privilege levels for the last N processes to be executed. The process history table may be updated when a current process is switched by writing a corresponding new process identifier and new privilege level in the entry at a next head of the circular buffer of the process history table. In some implementations, responsive to wraparound update of the process history table that overwrites an entry of the process history table, the integrated circuit may reset, to a special value that does not correspond to an entry in a process history table, all process history table indices in the control flow predictor. In some implementations, responsive to wraparound update of the process history table that overwrites an entry of the process history table, the integrated circuit may reset, to the special value, process history table indices in the control flow predictor that point to the overwritten entry of the process history table.

In some implementations (not shown in FIG. 5), the indication for the entry may be updated to activate the entry after execution of the control flow instruction in the current process, regardless of whether a corresponding prediction is validated. Similarly, the entry may be activated after a fixed number (e.g., a number greater than one) of executions of the control flow instruction in the current process.

The technique 500 includes updating 550 a table of prediction data (e.g., the table of prediction data 440 of the control flow predictor. For example, a saturating counter of the entry may be incremented or decremented based on the result of execution of the control flow instruction. For example, a branch history shift register of the entry may have a bit shifted in based on the result of execution of the control flow instruction.

Figure 6:
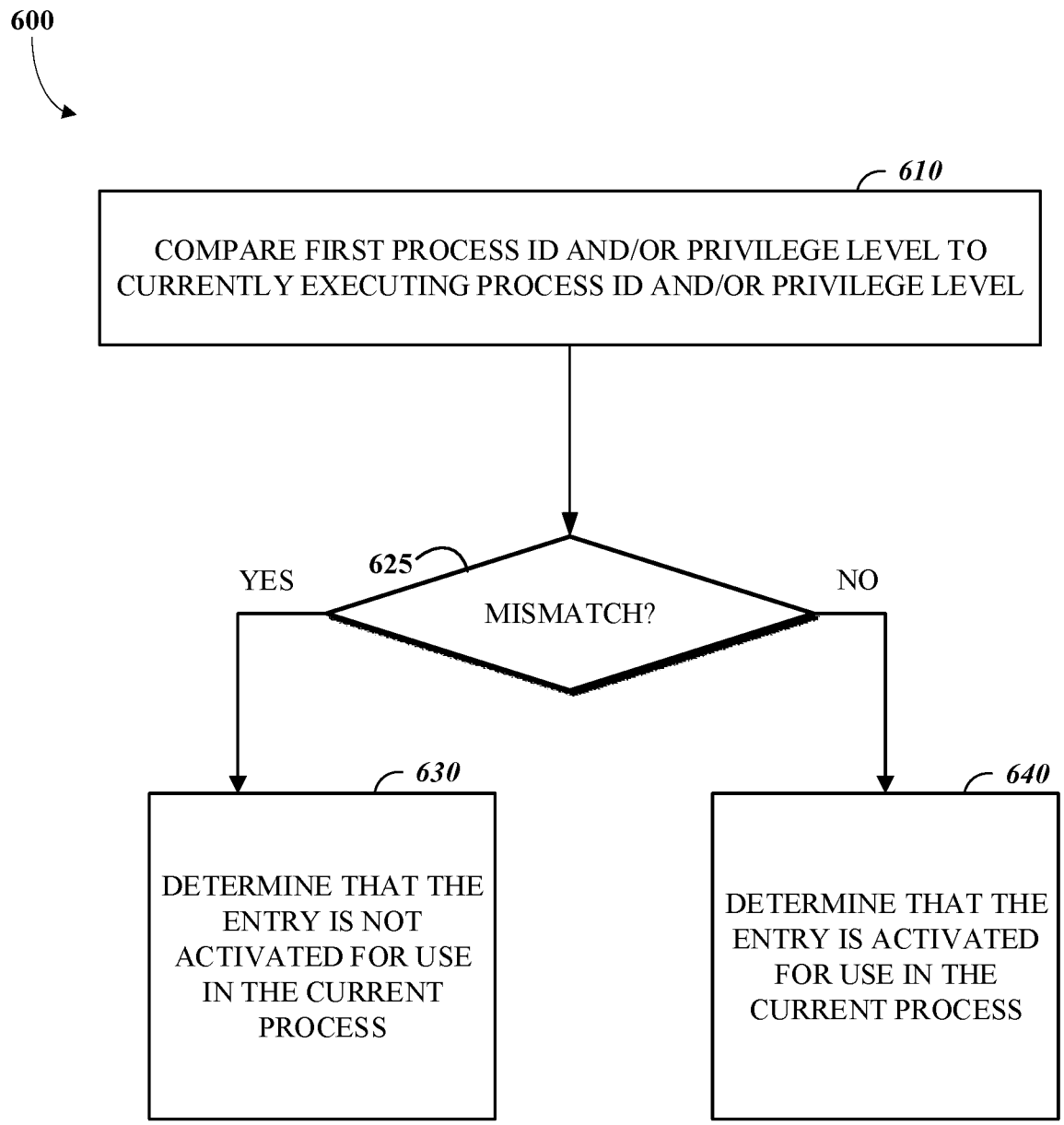
FIG. 6 is flow chart of an example of a technique for determining, based on a process identifier and/or a privilege level, whether an entry of a control flow predictor is activated for use with a current process.

FIG. 6 is flow chart of an example of a technique 600 for determining, based on a process identifier and/or a privilege level, whether an entry of a control flow predictor is activated for use with a current process. The technique 600 includes comparing 610 a first process identifier and/or a first privilege level of the entry to, respectively, the currently executing process identifier and/or the currently executing privilege level. For example, the currently executing process identifier and/or the currently executing privilege level may be stored in one or more registers (e.g., the one or more registers 360) of the integrated circuit. For example, comparing 610 the first process identifier and the currently executing process identifier may include checking for an exact match between the identifiers. In some implementations, comparing 610 the first privilege level and the currently executing privilege level includes checking for an exact match between the privilege levels. In some implementations, comparing 610 the first privilege level and the currently executing privilege level includes checking whether the first privilege level is less than or equal to the currently executing privilege level. For example, a mismatch may occur if the first privilege level is greater than the currently executing privilege level.

If (at operation 625) a mismatch is detected, then, responsive to a mismatch between the first process identifier and the currently executing process identifier or a mismatch between the first privilege level and the currently executing privilege level, determine 630 that the entry is not activated for use in the current process. If (at operation 625) a mismatch is not detected, then, responsive to a match between the first process identifier and the currently executing process identifier and/or a match between the first privilege level and the currently executing privilege level, determine 640 that the entry is activated for use in the current process.

Figure 7:
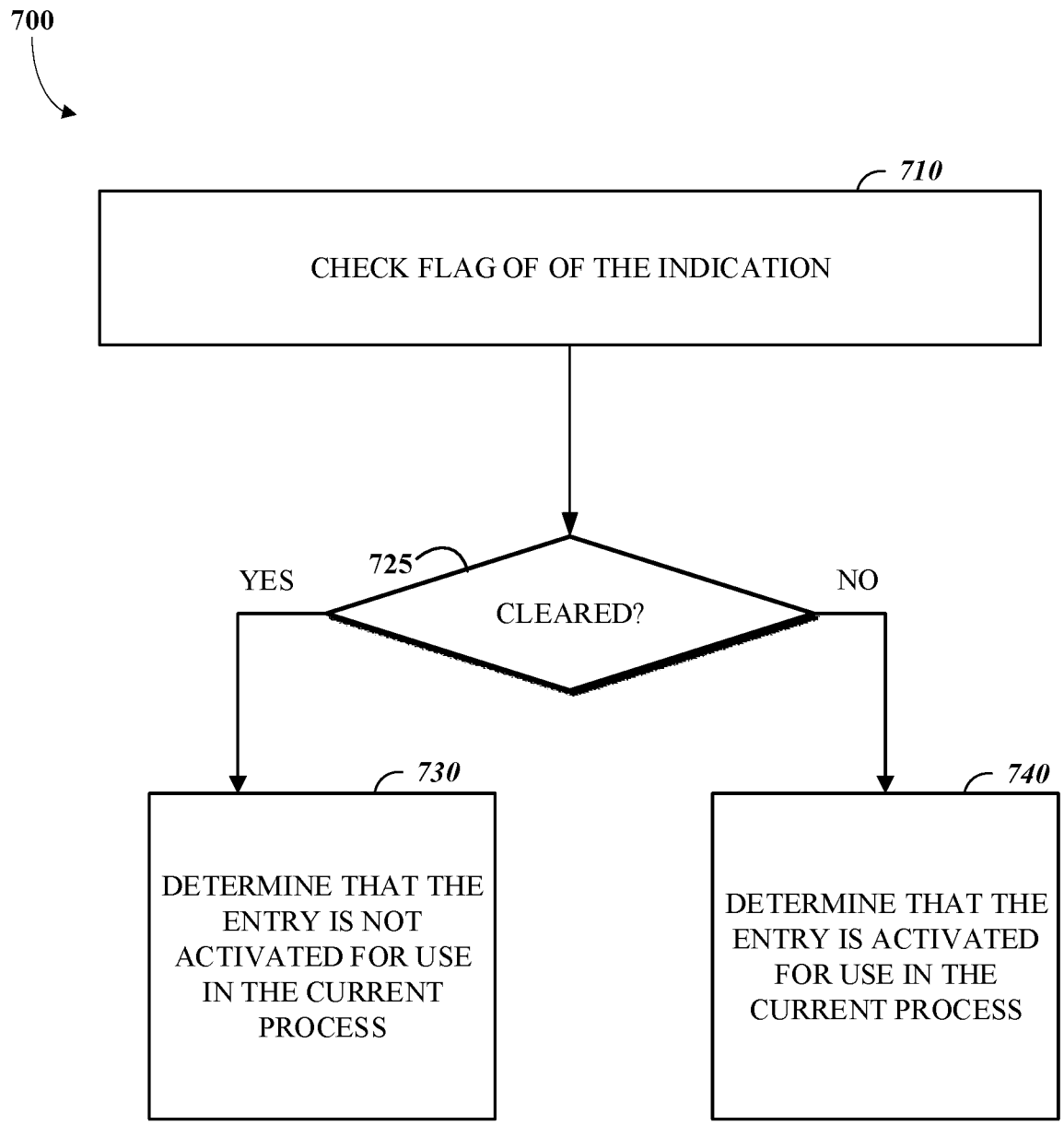
FIG. 7 is flow chart of an example of a technique for determining, based on a flag, whether an entry of a control flow predictor is activated for use with a current process.

FIG. 7 is flow chart of an example of a technique 700 for determining, based on a flag, whether an entry of a control flow predictor is activated for use with a current process. The indication of the entry may include the flag, which may be set when the entry is activated for a current process and cleared when a process switch occurs. The technique 700 includes checking 710 the flag. For example, the flag may be a bit stored in the entry of the control flow predictor. If (at operation 725), the flag is cleared, then the technique 700 includes, responsive to the flag being cleared, determining 730 that the current process is not activated to use the entry. If (at operation 725), the flag is not cleared, then the technique 700 includes, responsive to the flag being set, determining 740 that the entry is activated for use in the current process.

Figure 8:
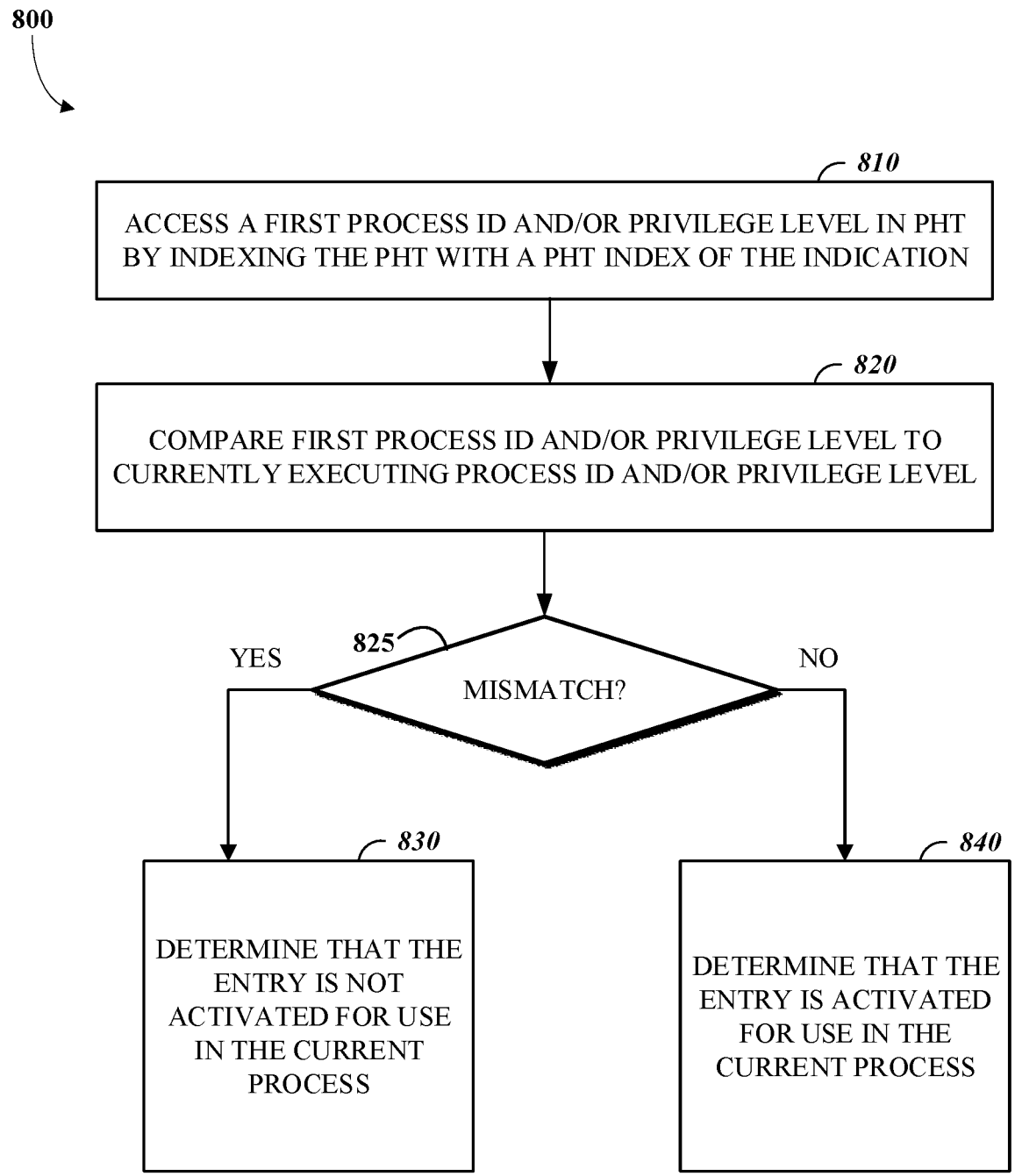
FIG. 8 is flow chart of an example of a technique for determining, using a process history table, whether an entry of a control flow predictor is activated for use with a current process.

FIG. 8 is flow chart of an example of a technique 800 for determining, using a process history table, whether an entry of a control flow predictor is activated for use with a current process. The indication of the entry may include a process history table index. The technique 800 includes accessing 810 a first process identifier and/or a first privilege level in a process history table by indexing the process history table with the process history table index of the indication. The technique 800 includes comparing 820 the first process identifier and/or the first privilege level to, respectively, the currently executing process identifier and/or the currently executing privilege level. For example, the currently executing process identifier and/or the currently executing privilege level may be stored in one or more registers (e.g., the one or more registers 360) of the integrated circuit. For example, comparing 820 the first process identifier and the currently executing process identifier may include checking for an exact match between the identifiers. In some implementations, comparing 820 the first privilege level and the currently executing privilege level includes checking for an exact match between the privilege levels. In some implementations, comparing 820 the first privilege level and the currently executing privilege level includes checking whether the first privilege level is less than or equal to the currently executing privilege level. For example, a mismatch may occur if the first privilege level is greater than the currently executing privilege level.

If (at operation 825) a mismatch is detected, then, responsive to a mismatch between the first process identifier and the currently executing process identifier or a mismatch between the first privilege level and the currently executing privilege level, determine 830 that the entry is not activated for use in the current process. If (at operation 825) a mismatch is not detected, then, responsive to a match between the first process identifier and the currently executing process identifier and/or a match between the first privilege level and the currently executing privilege level, determine 840 that the entry is activated for use in the current process.

In some implementations (not shown in FIG. 8), the process history table index can take a special value (e.g., NULL) that does not correspond to an entry in a process history table. For example, determining whether the entry of the control flow predictor associated with the control flow instruction is activated for use in the current process may include accessing the process history table index of the indication; comparing the process history table index to the special value; and, based on the process history table index matching the special value, determining that the entry is not activated for use in the current process.

Speculative Store Bypass (SSB) is a variant of Spectre vulnerability/attack that exploits a speculation predictor to infer information. For example, a speculation predictor may include a memory disambiguator.

Some of the techniques described above may be applied in a speculation predictor to prevent or mitigate SSB attacks. For example, entries of speculation predictor may include a process identifier and/or a privilege level, which may check against a currently executing process identifier and/or a currently executing privilege level to trigger application of a constraint on speculative execution based on data in the entry of speculation predictor. In some implementations, a speculation predictor may include entries that include respective indications of whether the entry has been activated for use in a current process. For example, the indication may include a flag that is set when the entry is activated for a current process and cleared when a process switch occurs. For example, the indication may include a process history table index.

For example, instead of determining the prediction based on data of the speculation predictor, the prediction used may be a random value. In some implementations, the constraint prevents changes in a microarchitectural state of the integrated circuit caused by speculative execution based on a speculation prediction prior to validation of the speculation prediction. In some implementations, the constraint prevents update of a cache caused by speculative execution based on a speculation prediction prior to validation of the speculation prediction. In some implementations, the constraint prevents cache lines from being evicted and refilled in a cache and prevents generation of transactions on an interconnection of integrated circuit in response to cache misses caused by speculative execution based on a speculation prediction prior to validation of the speculation prediction. In some implementations, the constraint prevents cache lines prefetches caused by speculative execution based on a speculation prediction prior to validation of the speculation prediction. In some implementations, the constraint prevents update of a translation look-aside buffer caused by speculative execution based on a speculation prediction prior to validation of the speculation prediction. In some implementations, the constraint prevents speculative control flow prediction caused by speculative execution based on a speculation prediction prior to validation of the speculation prediction.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An integrated circuit for executing instructions comprising:
   one or more registers configured to store a currently executing process identifier and a currently executing privilege level,
   an instruction decode buffer configured to store instructions fetched from memory while they are decoded for execution, and
   a control flow predictor with entries that include respective process identifiers and privilege levels, wherein each of the entries of the control predictor are configured to store prediction data that reflects history of results of execution of corresponding control flow instructions, and wherein the integrated circuit is configured to:
      access a first process identifier and a first privilege level in one of the entries that is associated with a control flow instruction stored in the decode buffer;
      compare the first process identifier and a first privilege level to, respectively, the currently executing process identifier and the currently executing privilege level;
      responsive to a mismatch between the first process identifier and the currently executing process identifier or a mismatch between the first privilege level and the currently executing privilege level, apply a constraint on speculative execution based on control flow prediction for the control flow instruction; and
      responsive to validation of a prediction for the control flow instruction by the control flow predictor, update the process identifier and the privilege level of the one of the entries that is associated with a control flow instruction to, respectively, the currently executing process identifier and the currently executing privilege level.

2. The integrated circuit of claim 1, in which the constraint disables use of the one of the entries that is associated with the control flow instruction, preventing control flow prediction for the control flow instruction.

3. The integrated circuit of claim 2, in which the one of the entries that is associated with the control flow instruction is discarded.

4. The integrated circuit of claim 1, in which the constraint disables use of the one of the entries that is associated with the control flow instruction, and causes speculative execution to proceed based on a prediction for the control flow instruction, wherein the prediction is independent of data stored in the control flow predictor.

5. The integrated circuit of claim 1, in which the constraint prevents changes in a microarchitectural state of the integrated circuit caused by speculative execution based on a control flow prediction for the control flow instruction prior to validation of the control flow prediction.

6. The integrated circuit of claim 1, in which the constraint prevents update of a cache caused by speculative execution based on a control flow prediction for the control flow instruction prior to validation of the control flow prediction.

7. The integrated circuit of claim 1, in which the constraint prevents cache lines from being evicted and refilled in a cache and prevents generation of transactions on an interconnection of integrated circuit in response to cache misses caused by speculative execution based on a control flow prediction for the control flow instruction prior to validation of the control flow prediction.

8. The integrated circuit of claim 1, in which the constraint prevents cache lines prefetches caused by speculative execution based on a control flow prediction for the control flow instruction prior to validation of the control flow prediction.

9. The integrated circuit of claim 1, in which the constraint prevents update of a translation look-aside buffer caused by speculative execution based on a control flow prediction for the control flow instruction prior to validation of the control flow prediction.

10. The integrated circuit of claim 1, in which the constraint prevents speculative control flow prediction caused by speculative execution based on a control flow prediction for the control flow instruction prior to validation of the control flow prediction.

11. The integrated circuit of claim 1, in which the control flow predictor includes a branch history table with entries that include respective process identifiers and privilege levels.

12. The integrated circuit of claim 1, in which the control flow predictor includes a branch target buffer with entries that include respective process identifiers and privilege levels.

13. The integrated circuit of claim 1, in which the control flow predictor includes a return address stack predictor with entries that include respective process identifiers and privilege levels.

14. The integrated circuit of claim 1, in which the integrated circuit is configured to:
update the currently executing process identifier and the currently executing privilege level stored in the one or more registers when the integrated circuit performs a context switch to a different process, or switches from a user process to an operating system, or switches from an operating system to a virtual machine hypervisor.

15. An integrated circuit for executing instructions comprising:
a control flow predictor with entries that include respective indications of whether the entry has been activated for use in a current process, wherein each of the entries of the control predictor are configured to store prediction data that reflects history of results of execution of corresponding control flow instructions, and wherein the integrated circuit is configured to:
access the indication in one of the entries that is associated with a control flow instruction that is scheduled for execution;
determine, based on the indication, whether the entry of the control flow predictor associated with the control flow instruction is activated for use in a current process;
responsive to a determination that the entry is not activated for use in the current process, apply a constraint on speculative execution based on control flow prediction for the control flow instruction; and
responsive to validation of a prediction for the control flow instruction by the control flow predictor, update the identification of the entry that is associated with a control flow instruction to activate the entry for use in the current process.

16. The integrated circuit of claim 15, in which the indication includes a first process identifier, the integrated circuit includes a register storing a currently executing process identifier, and wherein the integrated circuit is configured to determine whether the entry of the control flow predictor associated with the control flow instruction is activated for use in the current process by:
comparing the first process identifier to the currently executing process identifier; and
responsive to a mismatch between the first process identifier and the currently executing process identifier, determining that the entry is not activated for use in the current process.

17. The integrated circuit of claim 15, in which the indication includes a first privilege level, the integrated circuit includes a register storing a currently executing privilege level, and wherein the integrated circuit is configured to determine whether the entry of the control flow predictor associated with the control flow instruction is activated for use in the current process by:
comparing the first privilege level to the currently executing privilege level; and
responsive to a mismatch between the first privilege level and the currently executing privilege level, determining that the entry is not activated for use in the current process.

18. The integrated circuit of claim 15, in which the indication includes a flag that is set when the entry is activated for a current process and cleared when a process switch occurs, and wherein the integrated circuit is configured to determine whether the entry of the control flow predictor associated with the control flow instruction is activated for use in the current process by:
checking the flag; and
responsive to the flag being cleared, determining that the entry is not activated for use in the current process.

19. The integrated circuit of claim 18, in which the integrated circuit is configured to:
clear all of the indications in the control flow predictor when the integrated circuit performs a context switch to a different process, or switches from a user process to an operating system, or switches from an operating system to a virtual machine hypervisor.

20. The integrated circuit of claim 15, comprising:
a register storing a currently executing process identifier; and
a process history table with entries that include respective process identifiers and that are configured to be indexed using a process history table index, wherein the indication includes a process history table index.

21. The integrated circuit of claim 20, in which the integrated circuit is configured to determine whether the entry of the control flow predictor associated with the control flow instruction is activated for use in the current process by:
accessing a first process identifier in the process history table by indexing the process history table with the process history table index of the indication;
comparing the first process identifier to the currently executing process identifier; and
responsive to a mismatch between the first process identifier and the currently executing process identifier, determining that the entry is not activated for use in the current process.

22. The integrated circuit of claim 20, in which the process history table index can take a special value that does not correspond to an entry in the process history table, and the integrated circuit is configured to determine whether the entry of the control flow predictor associated with the control flow instruction is activated for use in the current process by:
  accessing the process history table index of the indication;
  comparing the process history table index to the special value; and
  based on the process history table index matching the special value, determining that the entry is not activated for use in the current process.

23. The integrated circuit of claim 22, in which the process history table is implemented as a circular buffer with N entries including respective process identifiers and privilege levels for the last N processes to be executed, wherein the process history table is updated when a current process is switched by writing a corresponding new process identifier and new privilege level in the entry at a next head of the circular buffer of the process history table, and the integrated circuit is configured to:
  responsive to wraparound update of the process history table that overwrites an entry of the process history table, reset, to the special value, all process history table indices in the control flow predictor.

24. The integrated circuit of claim 22, in which the process history table is implemented as a circular buffer with N entries including respective process identifiers and privilege levels for the last N processes to be executed, wherein the process history table is updated when a current process is switched by writing a corresponding new process identifier and new privilege level in the entry at a next head of the circular buffer of the process history table, and the integrated circuit is configured to:
  responsive to wraparound update of the process history table that overwrites an entry of the process history table, reset, to the special value, process history table indices in the control flow predictor that point to the overwritten entry of the process history table.

25. The integrated circuit of claim 20, in which the process history table is implemented as a circular buffer with N entries including respective process identifiers and privilege levels for the last N processes to be executed, wherein the process history table is updated when a current process is switched by writing a corresponding new process identifier and new privilege level in the entry at a next head of the circular buffer of the process history table.

26. The integrated circuit of claim 15, in which the constraint disables use of the one of the entries that is associated with the control flow instruction, preventing control flow prediction for the control flow instruction.

27. The integrated circuit of claim 26, in which the one of the entries that is associated with the control flow instruction is discarded.

28. The integrated circuit of claim 15, in which the constraint disables use of the one of the entries that is associated with the control flow instruction, and causes speculative execution to proceed based on a prediction for the control flow instruction, wherein the prediction is independent of data stored in the control flow predictor.

29. The integrated circuit of claim 15, in which the constraint prevents changes in a microarchitectural state of the integrated circuit caused by speculative execution based on a control flow prediction for the control flow instruction prior to validation of the control flow prediction.

30. The integrated circuit of claim 15, in which the constraint prevents update of a cache caused by speculative execution based on a control flow prediction for the control flow instruction prior to validation of the control flow prediction.

31. The integrated circuit of claim 15, in which the constraint prevents cache lines from being evicted and refilled in a cache and prevents generation of transactions on an interconnection of integrated circuit in response to cache misses caused by speculative execution based on a control flow prediction for the control flow instruction prior to validation of the control flow prediction.

32. The integrated circuit of claim 15, in which the constraint prevents cache line prefetches caused by speculative execution based on a control flow prediction for the control flow instruction prior to validation of the control flow prediction.

33. The integrated circuit of claim 15, in which the constraint prevents update of a translation look-aside buffer caused by speculative execution based on a control flow prediction for the control flow instruction prior to validation of the control flow prediction.

34. The integrated circuit of claim 15, in which the constraint prevents speculative control flow prediction caused by speculative execution based on a control flow prediction for the control flow instruction prior to validation of the control flow prediction.

35. The integrated circuit of claim 15, in which the control flow predictor includes a branch history table with entries that include respective indications of whether the entry has been activated for use in a current process.

36. The integrated circuit of claim 15, in which the control flow predictor includes a branch target buffer with entries that include respective indications of whether the entry has been activated for use in a current process.

37. The integrated circuit of claim 15, in which the control flow predictor includes a return address stack predictor with entries that include respective indications of whether the entry has been activated for use in a current process.

38. A method comprising:
  accessing an indication in an entry in a control flow predictor that is associated with a control flow instruction that is scheduled for execution, wherein the entry is one of multiple entries of the control flow predictor and each of the entries of the control predictor are configured to store prediction data that reflects history of results of execution of corresponding control flow instructions;
  determining, based on the indication, whether the entry of the control flow predictor associated with the control flow instruction is activated for use in a current process;
  responsive to a determination that the entry is not activated for use in the current process, applying a constraint on speculative execution based on control flow prediction for the control flow instruction;
  executing the control flow instruction and one or more subsequent instructions subject to the constraint; and
  responsive to validation of a prediction for the control flow instruction by the control flow predictor, update the identification of the entry that is associated with a control flow instruction to activate the entry for use in the current process.

39. The method of claim 38, in which the indication includes a first process identifier, and wherein determining whether the entry of the control flow predictor associated with the control flow instruction is activated for use in the current process comprises:
  comparing the first process identifier to a currently executing process identifier; and responsive to a mismatch between the first process identifier and the currently executing process identifier, determining that the entry is not activated for use in the current process.

40. The method of claim 38, in which the indication includes a first privilege level, and wherein determining whether the entry of the control flow predictor associated with the control flow instruction is activated for use in the current process comprises:
   comparing the first privilege level to a currently executing privilege level; and
   responsive to a mismatch between the first privilege level and the currently executing privilege level, determining that the entry is not activated for use in the current process.

41. The method of claim 38, in which the indication includes a flag that is set when the entry is activated for a current process and cleared when a process switch occurs, and wherein determining whether the entry of the control flow predictor associated with the control flow instruction is activated for use in the current process comprises:
   checking the flag; and
   responsive to the flag being cleared, determining that the current process is not activated to use the entry.

42. The method of claim 38, in which the indication includes a process history table index, and determining whether the entry of the control flow predictor associated with the control flow instruction is activated for use in the current process comprises:
   accessing a first process identifier in a process history table by indexing the process history table with the process history table index of the indication;
   comparing the first process identifier to a currently executing process identifier; and
   responsive to a mismatch between the first process identifier and the currently executing process identifier, determining that the entry is not activated for use in the current process.

43. The method of claim 38, in which the indication includes a process history table index, the process history table index can take a special value that does not correspond to an entry in a process history table, and determining whether the entry of the control flow predictor associated with the control flow instruction is activated for use in the current process comprises:
   accessing the process history table index of the indication;
   comparing the process history table index to the special value; and
   based on the process history table index matching the special value, determining that the entry is not activated for use in the current process.

44. The method of claim 43, in which the process history table is implemented as a circular buffer with N entries including respective process identifiers and privilege levels for the last N processes to be executed, wherein the process history table is updated when a current process is switched by writing a corresponding new process identifier and new privilege level in the entry at a next head of the circular buffer of the process history table, and further comprising:
   responsive to wraparound update of the process history table that overwrites an entry of the process history table, reset, to the special value, all process history table indices in the control flow predictor.

45. The method of claim 43, in which the process history table is implemented as a circular buffer with N entries including respective process identifiers and privilege levels for the last N processes to be executed, wherein the process history table is updated when a current process is switched by writing a corresponding new process identifier and new privilege level in the entry at a next head of the circular buffer of the process history table, and further comprising:
   responsive to wraparound update of the process history table that overwrites an entry of the process history table, reset, to the special value, process history table indices in the control flow predictor that point to the overwritten entry of the process history table.

46. The method of claim 38, in which the constraint disables use of the entry that is associated with the control flow instruction, preventing control flow prediction for the control flow instruction.

47. The method of claim 46, comprising:
   discarding the entry that is associated with the control flow instruction.

48. The method of claim 38, in which the constraint disables use of the entry that is associated with the control flow instruction, and causes speculative execution to proceed based on a prediction for the control flow instruction, wherein the prediction is independent of data stored in the control flow predictor.

49. The method of claim 38, in which the constraint prevents changes in a microarchitectural state of an integrated circuit caused by speculative execution based on a control flow prediction for the control flow instruction prior to validation of the control flow prediction.

50. The method of claim 38, in which the constraint prevents update of a cache caused by speculative execution based on a control flow prediction for the control flow instruction prior to validation of the control flow prediction.

51. The method of claim 38, in which the constraint prevents cache lines from being evicted and refilled in a cache and prevents generation of transactions on an interconnection of integrated circuit in response to cache misses caused by speculative execution based on a control flow prediction for the control flow instruction prior to validation of the control flow prediction.

52. The method of claim 38, in which the constraint prevents cache line prefetches caused by speculative execution based on a control flow prediction for the control flow instruction prior to validation of the control flow prediction.

53. The method of claim 38, in which the constraint prevents update of a translation look-aside buffer caused by speculative execution based on a control flow prediction for the control flow instruction prior to validation of the control flow prediction.

54. The method of claim 38, in which the constraint prevents speculative control flow prediction caused by speculative execution based on a control flow prediction for the control flow instruction prior to validation of the control flow prediction.

55. The method of claim 38, in which the control flow predictor includes a branch history table with entries that include respective indications of whether the entry has been activated for use in a current process.

56. The method of claim 38, in which the control flow predictor includes a branch target buffer with entries that include respective indications of whether the entry has been activated for use in a current process.

57. The method of claim 38, in which the control flow predictor includes a return address stack predictor with entries that include respective indications of whether the entry has been activated for use in a current process.

58. The method of claim 38, comprising:
   clearing all of the indications in the control flow predictor when an integrated circuit performs a context switch to a different process, or switches from a user process to an operating system, or switches from an operating system to a virtual machine hypervisor.

\* \* \* \* \*